(12) United States Patent
Taylor (10) Patent No.: US 9,846,913 B2
(45) Date of Patent: Dec. 19, 2017

(54) METHOD AND SYSTEM FOR REMOTELY VERIFYING WEATHER DAMAGE TO A VEHICLE

(71) Applicant: HTI, IP, L.L.C., Arlington, VA (US)

(72) Inventor: Thomas Steven Taylor, Atlanta, GA (US)

(73) Assignee: Verizon Telematics Inc., Atlanta, GA (US)

( * ) Notice: Subject to any disclaimer, the term of this patent is extended or adjusted under 35 U.S.C. 154(b) by 315 days.

(21) Appl. No.: 14/294,769

(22) Filed: Jun. 3, 2014

(65) Prior Publication Data
US 2015/0348203 A1    Dec. 3, 2015

(51) Int. Cl.
G06Q 40/00 (2012.01)
G06Q 40/08 (2012.01)
G01S 19/14 (2010.01)

(52) U.S. Cl.
CPC .............. *G06Q 40/08* (2013.01); *G01S 19/14* (2013.01)

(58) Field of Classification Search
CPC ................................ G06Q 40/08; G06Q 40/00
USPC ..................................................... 705/35–45
See application file for complete search history.

(56) References Cited

U.S. PATENT DOCUMENTS

| | | | | |
|---|---|---|---|---|
| 2002/0067289 A1* | 6/2002 | Smith | .................. | G08G 1/0962 340/905 |
| 2005/0065682 A1* | 3/2005 | Kapadia | ................ | B64F 5/0081 701/36 |
| 2007/0225882 A1* | 9/2007 | Yamaguchi | ........... | B60W 50/14 701/36 |
| 2013/0218604 A1* | 8/2013 | Hagelstein | ............. | G06Q 40/08 705/4 |
| 2014/0279707 A1* | 9/2014 | Joshua | ............... | G06Q 30/0283 705/400 |
| 2014/0288820 A1* | 9/2014 | Opshaug | ................ | G01C 21/30 701/412 |

\* cited by examiner

*Primary Examiner* — Chia Yi Liu
*Assistant Examiner* — Jennifer Liu (57) ABSTRACT

A system comprises a weather data network configured receive a severe weather profile including severe weather duration data, severe weather geographic boundary data, and severe weather type data. The system receives an automotive sensor profile for at least one individual vehicle including individual vehicle geographic location data. The system determines and stores a vehicle exposure profile for the at least one individual vehicle including proximity of said individual vehicle geographic location data to the severe weather geographic boundary data.

20 Claims, 7 Drawing Sheets

| | | | | | | | | | | | | Claim Directed to Weather Damage | 5 Nearby Weather Damage Claims |
|---|---|---|---|---|---|---|---|---|---|---|---|---|---|
| | x | | | | | | | | | | | | |
| | x | | | x | | | | | | | | | |
| x | | | x | x | | | | x | x | | | | |
| x | | x | x | x | | | | x | x | | | | |
| x | | x | x | x | | | | x | x | | | | |
| x | | x | x | x | | | | x | x | | | | |
| Snow 130 | Ice 130 | Weather Duration 126 | Weather Geographic Region 128 | Proximity to Severe Weather 142 | Anti-lock Brake Activation 144 | Vehicle in Motion 146 | Vehicle Speed 148 | Vehicle Telemetry Data 150 | Audio Sensor Data 156 | Vibration Sensor Data 154 | Airbag Activation 152 | Collision Claim 170 | Comprehensive Claim 170 | Proximity to Similar Claims 172 |
| | | | | | No | No | 55 mph | | | | No | | | |
| Weather Profile 142 | | | | Automotive Sensor Profile 138 | | | | | | | | Insurance Claim Profile 168 | | |
| Vehicle Exposure Profile 186 | | | | | Insurance Exposure Profile 188 | | | | | | | | | |
| Insurance Avoidance Profile: 190 : NO | | | | | | | | | | | | | | |

| | Weather Profile 142 | | | | Automotive Sensor Profile 138 | | | | | | | Insurance Claim Profile 168 | | |
|---|---|---|---|---|---|---|---|---|---|---|---|---|---|---|
| | Snow 130 | Ice 130 | Weather Duration 126 | Weather Geographic Region 128 | Proximity to Severe Weather 142 | Anti-lock Brake Activation 144 | Vehicle in Motion 146 | Vehicle Speed 148 | Vehicle Telemetry Data 150 | Audio Sensor Data 156 | Vibration Sensor Data 154 | Airbag Activation 152 | Collision Claim 170 | Comprehensive Claim 170 | Proximity to Similar Claims 172 |
| | x | | | | | | | | | | | | | | |
| | x | | | | | | | | | | | | | | |
| | x | | x | | | | | | | | | | | | |
| | | x | x | x | x | | | | | | | | | | 5 Nearby Weather Damage Claims |
| | | x | x | x | x | No | No | 0 mph | | | | No | | | |
| | | x | x | x | x | | | | | | | | | | |

Vehicle Exposure Profile 186

Insurance Exposure Profile 188

Insurance Avoidance Profile: 190 : YES

FIG. 4

| | Weather Duration 126 | Weather Georgraphic Region 128 | Proximity to Severe Weather 142 | Anti-lock Brake Activation 144 | Vehicle in Motion 146 | Vehicle Speed 148 | Vehicle Telemetry Data 150 | Audio Sensor Data 156 | Vibration Sensor Data 154 | Airbag Activation 152 | Claim Directed to Snow Induced Collision Damage | 5 Nearby Weather Damage Claims |
|---|---|---|---|---|---|---|---|---|---|---|---|---|
| Snow 130 | | | x | | | | | | | | | x |
| Ice 130 | x | x | | | | | | | | | | x |
| Weather 130 | x | x | | | | | | | | | | x |
| | | x | | | | | | | | | | x |
| | | x | x | | | | | | | | | |
| | | | x | No | No | 0 mph | | | | No | | |
| | | | | | | | | | | | Collision Claim 170 | Comprehensive Claim 170 | Proximity to Similar Claims 172 |
| Weather Profile 142 | | | Automotive Sensor Profile 138 | | | | | | | | Insurance Claim Profile 168 | |
| Vehicle Exposure Profile 186 | | | | | | | Insurance Exposure Profile 188 | | | | | |
| Insurance Avoidance Profile: 190 : NO | | | | | | | | | | | | |

METHOD AND SYSTEM FOR REMOTELY VERIFYING WEATHER DAMAGE TO A VEHICLE

BACKGROUND

Vehicle damage from severe weather represents a significant cost to both vehicle owners as well as insurance companies. Severe weather warnings targeted to vehicles present or entering into a severe weather region can reduce these associated vehicle damage costs. Verification of which vehicles are within a severe weather region at the time of the severe weather can facilitate the identification of both legitimate and fraudulent insurance claims. There is a need for the ability to correlate vehicle location with severe weather locations to avoid unnecessary vehicle damage as well as reduce incidents of fraudulent insurance claims.

DETAILED DESCRIPTION

Severe weather systems can generate a significant destructive force that may damage property such as automotive vehicles resulting in financial loss to both vehicle owners as well as insurance companies. A system may be provided for monitoring and storing information relative to severe weather time and location. This same system may also identify individual vehicle locations that are in or near the location of the severe weather. The identification of such vehicles allows for the providing of warning signals to these vehicles to avoid or minimize vehicle damage. Additionally, the identification and storage of this vehicle information provides a method of verifying insurance damage claims.

Figure 1:
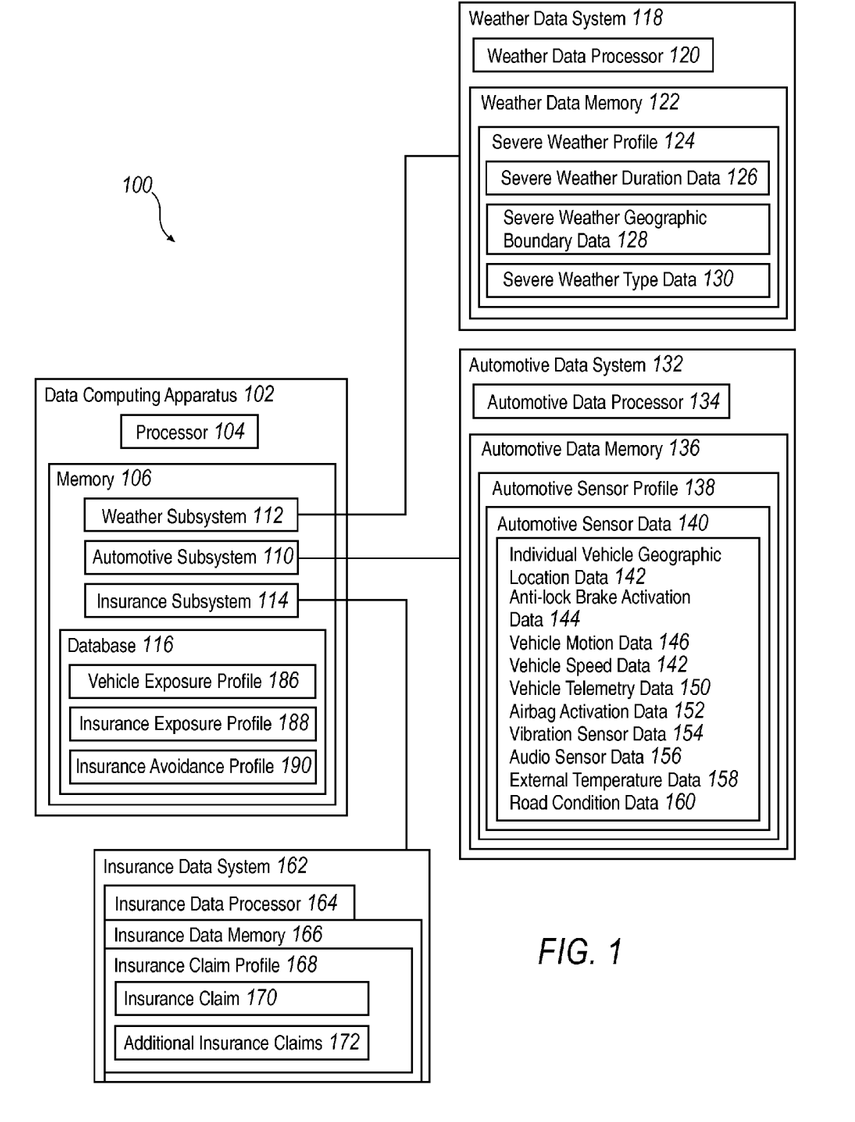
FIG. 1 illustrates an exemplary system for insurance data computing.

FIG. 1 illustrates an exemplary system 100 having a risk data computing apparatus such as an insurance exposure data computing apparatus 102. The computing device 102 may include a processor 104, a memory 106. The memory 106 may hold an automotive subsystem 110, a weather subsystem 112, an insurance subsystem 114 (or general risk subsystem), and database 116. The subsystems 110, 112, 114 may be entirely contained and controlled by the computing device 102 or may comprise independent computing systems. In one exemplary illustration the weather subsystem 112 is in communication with a weather data system 118 including a weather data processor 120 and a weather data memory 122. The weather data memory 122 may include a severe weather profile 124 storage including severe weather duration data 126, severe weather geographic boundary data 128 and severe weather type data 130.

The automotive subsystem 110 may be in communication with an automotive data system 132 including an automotive data processor 134 and an automotive data memory 136. The automotive data memory 136 may include an automotive sensor profile 138 including automotive sensor data 140. The automotive sensor data 140 may include, but is not limited to, individual vehicle geographic location data 142, anti-lock brake activation data 144, vehicle motion data 146, vehicle speed data 148, vehicle telemetry data 150, airbag activation data 152, vibration sensor data 154, audio sensor data 156, external temperature data 158 and road condition data 160.

The insurance subsystem 114 may be in communication with an insurance data system 162 including an insurance data processor 164 and an insurance data memory 166. The insurance data memory 166 may include an insurance claim profile 168 including at least one insurance claim 170 and a plurality of additional insurance claims 172. These insurance claims 172 may be comprised of the type of insurance claim, collision or comprehensive, and may include details regarding the specifics of the incident and damage to the vehicle being claimed.

Figure 2:
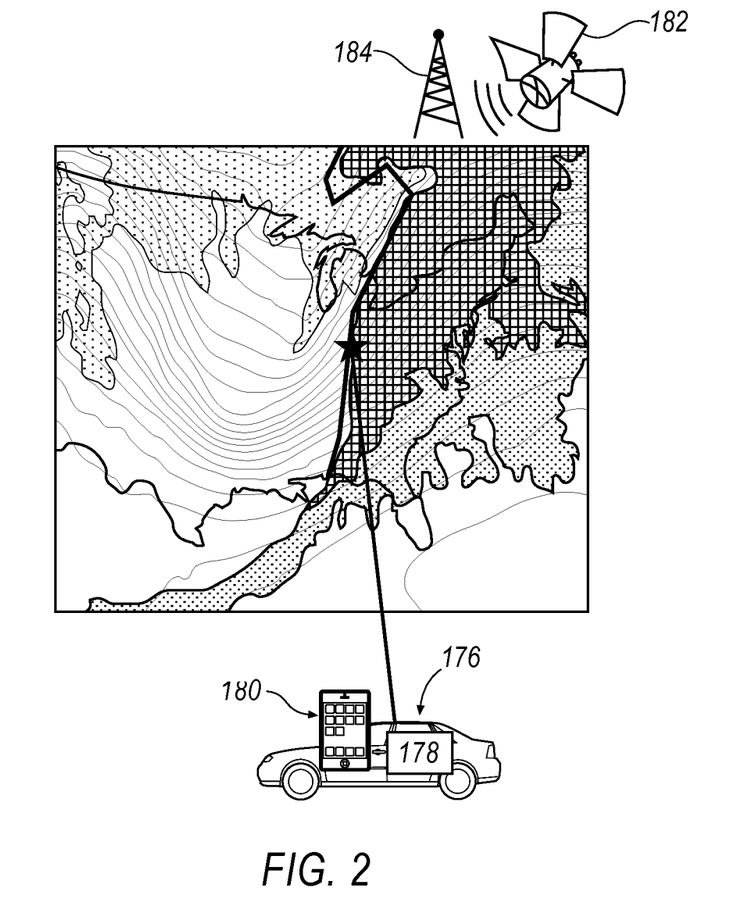
FIG. 2 illustrates a severe weather profile and automotive sensor profile.

As illustrated in FIGS. 1 and 2, the insurance exposure data computing apparatus 102 receives a severe weather profile 124 from the weather subsystem 112 and or the weather data system 118. The severe weather profile includes severe weather duration data 126, severe weather geographic boundary data 128 and severe weather type data 130. This information may be accumulated through a variety of non-limiting methodologies and sources. In one exemplary illustration the information may be received from national weather monitoring services. In another it may be generated through the accumulation of data from local weather stations. The severe weather geographic boundary data 128 is intended to encompass the geographic boundary 174 of the severe weather front. This boundary 174 will continuously change over time and so it is associated with the severe weather duration data 126 to generate a time based profile 124. The severe weather data type 130 may include details as to the type of severe weather contained within the severe weather geographic boundary 128. In one exemplary illustration this may include the amount and type of precipitation, wind speed, snow accumulation, temperature, icing conditions, freezing rain, hail, and other known weather conditions. These may be received directly or may be interpreted from general weather data such as by pairing precipitation to freezing temperatures to identify icing or freezing rain.

In addition to the receiving the severe weather profile 124, the insurance exposure data computing apparatus 102 also receives data from the automotive subsystem 112 and/or the automotive data system 132. The automotive data system 132 obtains the automotive sensor profile 138 by way of communication with at least one individual vehicle 176 having at least one automotive sensor 178 incorporated therein. In one exemplary illustration this is accomplished through a mobile device 180 that provides the individual vehicle geographic location data 142 on a real-time or at least a near real-time basis. The individual vehicle geographic location data 142 may be determined through the use of a mobile device 180 in communication with the GPS 182 and/or the plurality of network towers 184. This may be done using the GPS 182. It may also be done using multilateration of radio signals wherein the location of a nearby antenna tower 184 to the mobile device 180 is used to locate the device, i.e. triangulation. Additionally, software within the mobile device 180 may be used to identify the location of the device 180. In this example, the service provider may continuously receive location information from the mobile device 180. In another example, signal strength and mobile device identification may be used to track the location of the mobile device 180. The mobile device 180 may include systems integrated into a vehicle 176, such as navigational or communication systems integrated into a vehicle dashboard, as well as plug-in cellular systems that have access to the vehicle's on-board-diagnostics, such as systems configured to provide access to a cellular phone's communication and processing power.

Figure 3:
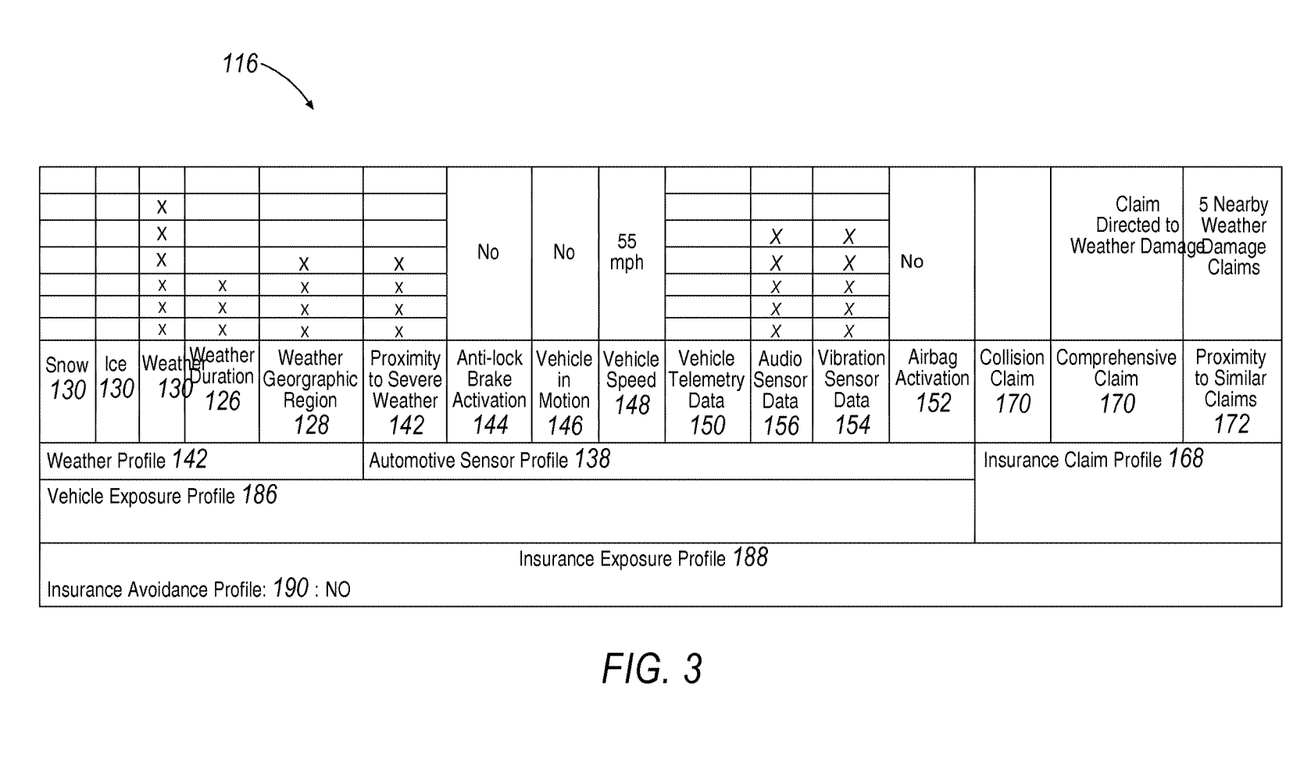
FIG. 3 illustrates an insurance exposure profile calculation for hail damage.

The insurance exposure data computing apparatus 102 utilizes the severe weather Profile 124 and the automotive sensor profile 138 to determine a vehicle exposure profile 186 as illustrated in database 116 shown in FIG. 3. The insurance exposure data computing apparatus 102 utilizes the vehicle exposure profile 186 to determine if the at least one individual vehicle 176 is within or approaching the geographic boundary 174 associated with the severe geographic boundary data 128. The insurance exposure data computing apparatus 102 may then contact an individual associated with the individual vehicle 176 to communicate a warning, such as via the mobile device 180, with instructions to avoid the severe weather. In one exemplary illustration this may be to avoid travel in or towards the severe weather. In another, it may be to refrain from operating the vehicle in the severe weather. In still another, it may be to move the vehicle into a sheltered area such as a garage in order to prevent damage. The communication may utilize one or more networks of various types. For example, communication may include a cable network (e.g., an optical cable network), a wireless satellite network, a wireless public land mobile network (PLMN) (e.g., a Code Division Multiple Access (CDMA) 2000 PLMN, a Global System for Mobile Communications (GSM) PLMN, a Long Term Evolution (LTE) PLMN and/or other types of PLMNs), a telecommunications network (e.g., a Public Switched Telephone Network (PSTN)), a local area network (LAN), a wide area network (WAN), a metropolitan area network (MAN), an intranet, and/or the Internet. The warning communication may be sent through any of the aforementioned networks or may be passed from vehicle to vehicle transmissions. It should be understood, however, that additional or alternative components and/or implementations may be used.

The risk (insurance exposure) data computing apparatus 102 utilizes the vehicle exposure profile 186 to determine a risk (insurance) exposure profile 188. The risk (insurance) exposure profile 188 may be utilized to determine if the owner of the at least one individual vehicle 176 took corrective action to avoid the severe weather. Therefore, in one exemplary illustration, if the vehicle 176 avoids entering the severe weather profile 124, the apparatus 102 may assign a risk (insurance) avoidance profile 190 to the vehicle. In this illustration, the risk (insurance) avoidance profile 190 indicates that although the vehicle 176 was in or near the severe weather profile 124, the vehicle 176 avoided or left the severe geographic boundary 174. This may allow the apparatus 102 to assign a premium discount to the insurer of the vehicle for taking preventative measures to avoid severe weather.

The automotive sensor profile 138 utilized in determining the vehicle exposure profile 186 may include additional vehicle sensor data in addition to the individual vehicle geographic location data 142. In one exemplary illustration, as previously discussed, the automotive sensor profile 138 may include, but is not limited to, individual vehicle geographic location data 142, anti-lock brake activation data 144, vehicle motion data 146, vehicle speed data 148, vehicle telemetry data 150, airbag activation data 152, vibration sensor data 154, audio sensor data 156, external temperature data 158 and road condition data 160. This additional vehicle sensor data may be continually monitored or the at least one automotive sensor 178 may be remotely activated by the apparatus 102 when the vehicle 176 enters the severe weather geographic boundary 174.

The vehicle exposure profile 186 and the resultant determined insurance exposure profile 188, when including these additional sensor details, will provide further insight into any preventative measures taken by the vehicle owner. In the particular illustrative example of FIG. 4, the severe weather type data 130 indicates the presence of hail, the individual geographic location data 142 indicates a location within the severe weather geographic boundary data 128, the vehicle speed data 148 indicates the vehicle is stopped and the audio and vibration sensor data 154,156 do not indicate the signature of hail. In this illustrative example, the insurance exposure profile 188 would be indicative of the vehicle having been sheltered in a structure such as a garage. In this case an insurance avoidance profile 190 may be assigned along with the associated premium discounts even though the vehicle 176 was within the severe geographic boundary 174. Similar evaluations of the insurance exposure profile 188 may result in insurance avoidance profiles 190 for not driving in snowfall, reduced speed in raining conditions, or no actuation of the anti-lock brakes in ice conditions. All these profiles would be indicative of safe decision making on the part of the vehicle owner.

Figure 4:
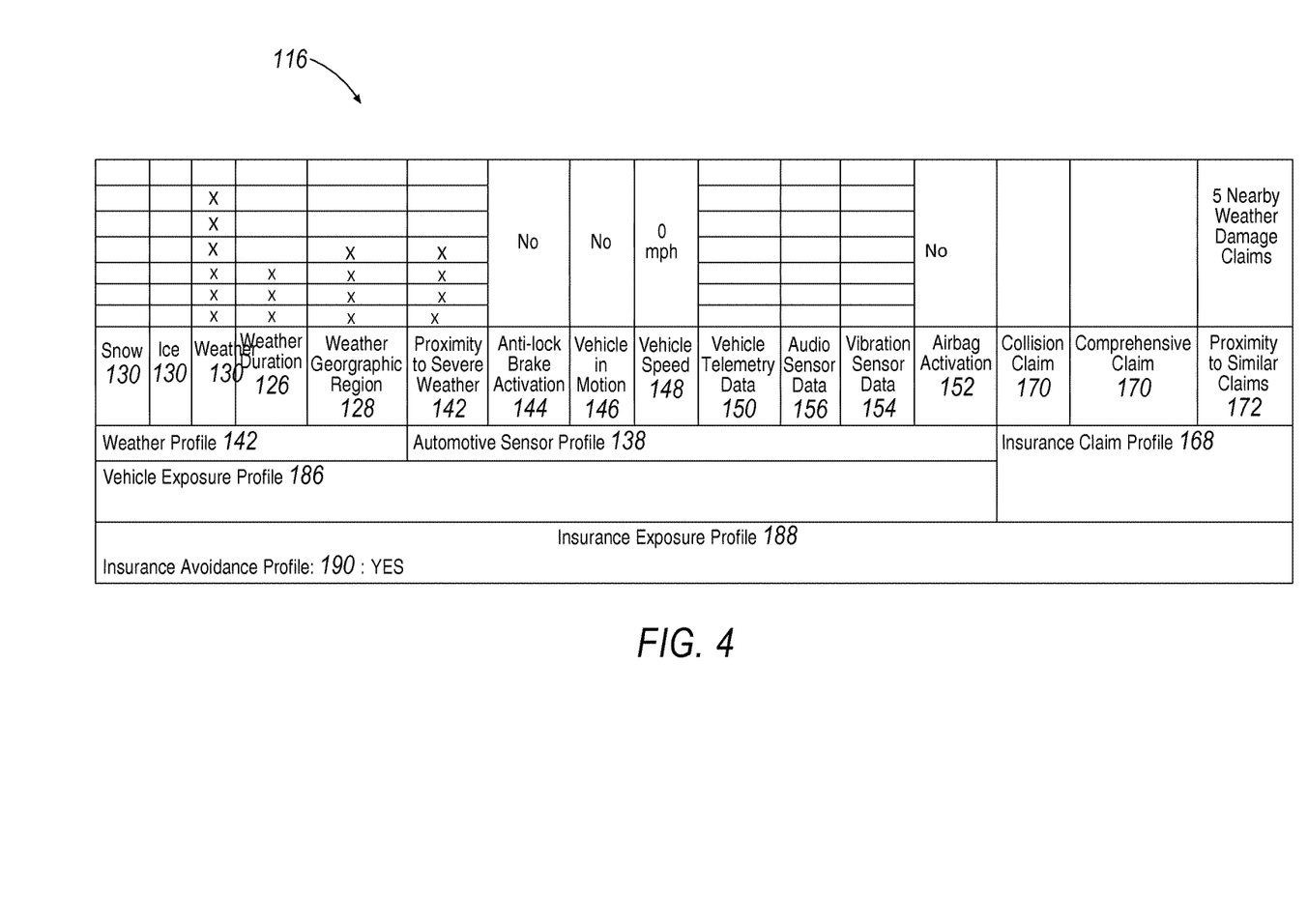
FIG. 4 illustrates an insurance exposure profile calculation for a alternate hail damage scenario.
Figure 5:
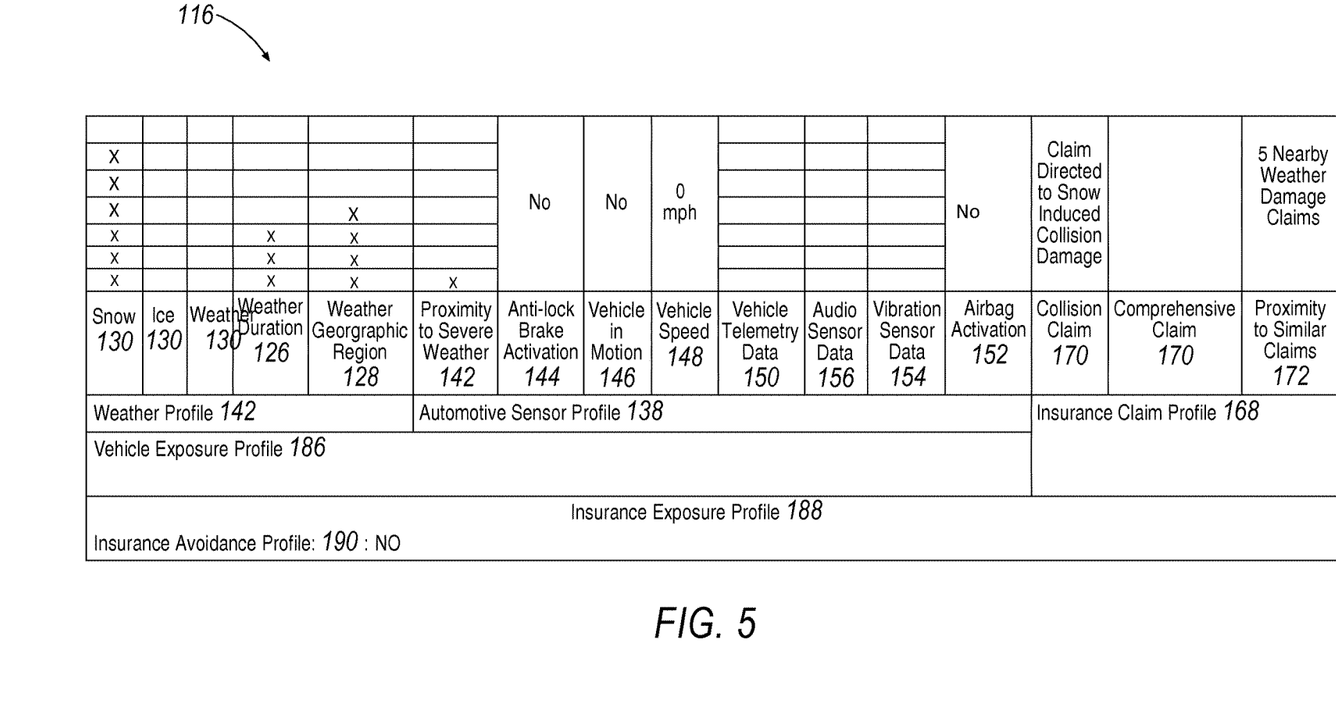
FIG. 5 illustrates an insurance exposure profile calculation a fraudulent snow damage claim.

As illustrated in FIGS. 3-5, the insurance exposure profile 188 may additionally include an insurance claim profile 168. The insurance claim profile 168 includes at least one insurance claim 170 filed in connection with the at least one vehicle 176. The insurance exposure data computing apparatus 102 may utilize the insurance claim profile 168 to determine the validity of the at least one insurance claim 170. The insurance exposure profile 188 compares the vehicle exposure profile 186 to the insurance claim profile 168 to access the validity of the claim. In an illustrative example in FIG. 3, the vehicle exposure profile 168 indicates severe weather type data 130 indicating the presence of hail. The individual geographic location data 142 indicates the vehicle presence within the severe weather profile 124. The audio and vibration sensor data 154, 156 indicates the signature of hail. Therefore, the insurance exposure profile 188 would be indicative of a valid claim. The insurance claim profile 168 may also include additional insurance claims 172. A presence of such similar claims in proximity to the at least one insurance claim 170 could be used to further strengthen validity of the claim.

In contrast, the illustrative example in FIG. 5 has a vehicle exposure profile 168 having a severe weather type data 130 that indicates the presence of snow. The individual geographic location data 142 does not indicate the vehicle presence within the severe weather profile 124. The anti-lock brake activation data 144 and vehicle motion data 146 do not indicate the vehicle was being driven. Furthermore, there are no additional insurance claims 172 indicating any other such claims for damage in the proximity. Therefore, the insurance claim profile 168 would be indicative of an invalid claim. The insurance claim 170 may be flagged for further investigation prior to fulfillment.

In general, computing systems and/or devices, such as the data computing apparatus 102, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, a computer workstation, a server, a desktop, notebook, laptop, or handheld computer, or some other computing system and/or device.

Computing devices such as the data computing apparatus 102, the weather data system 112, the automotive data system 132, or the insurance data system 162 generally include computer-executable instructions such as the instructions of the receiving, sending, correlating and storing, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C#, Objective C, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

Figure 6:
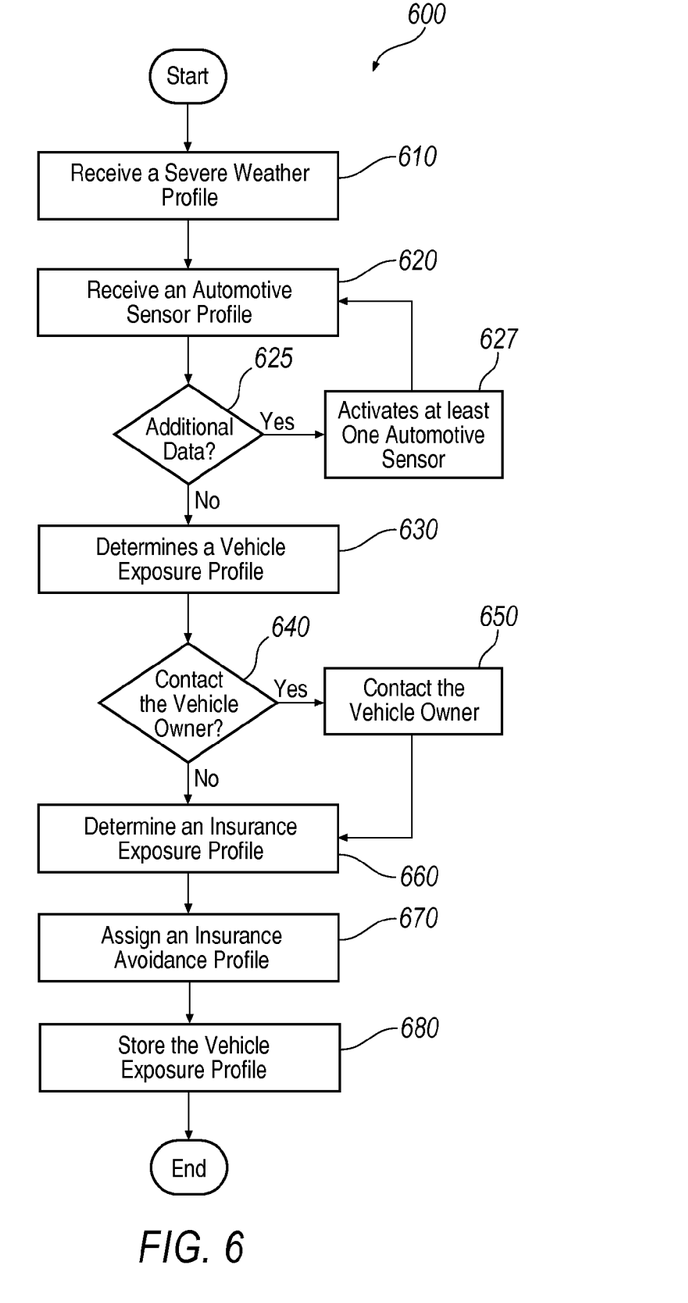
FIG. 6 illustrates an exemplary process flow for computing an insurance exposure profile.

FIG. 6 illustrates an exemplary process flow 600 for computing insurance exposure data. In block 610 the system receives a severe weather profile including severe weather duration data, severe weather geographic boundary data, and severe weather type data. In block 620 the system receives an automotive sensor profile for at least one individual vehicle, the automotive sensor profile including individual vehicle geographic location data. In block 625 the system decides if to obtain further automotive sensor data. In block 627 the system activates at least one automotive sensor. In block 630 the system determines a vehicle exposure profile for the at least one individual vehicle, the vehicle exposure profile including proximity of the individual vehicle geographic location data to the severe weather geographic boundary data. In decision block 640 the system queries whether to contact the vehicle owner. In block 650 the system contacts the vehicle owner to provide notification of severe weather. In block 660 the system determines an insurance exposure profile for the at least one individual vehicle using the vehicle exposure profile when the vehicle exposure profile indicates the individual vehicle geographic location is within or approaching the severe weather geographic boundary data. In block 670 the system assigns an insurance avoidance profile when the automotive sensor profile indicates the at least one individual vehicle is not operating within the severe weather geographic boundary data. In block 680 the system stores the vehicle exposure profile.

Figure 7:
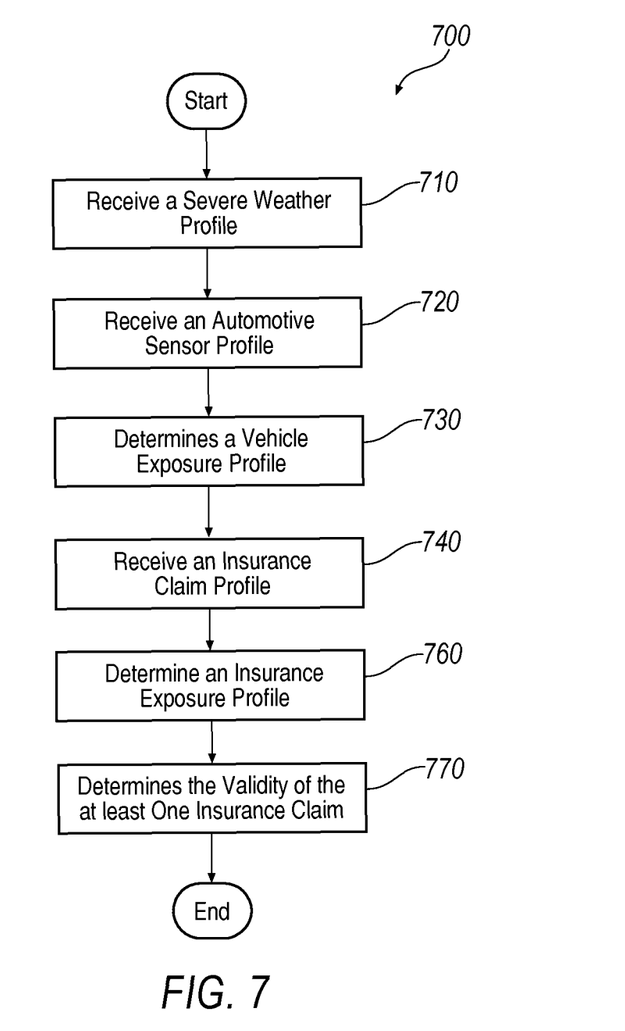
FIG. 7 illustrates an alternate exemplary process flow for computing an insurance exposure profile.

FIG. 7 illustrates an alternate exemplary process flow 700 for computing insurance exposure data. In block 710 the system receives a severe weather profile including severe weather duration data, severe weather geographic boundary data, and severe weather type data. In block 720 the system receives an automotive sensor profile for at least one individual vehicle, the automotive sensor profile including individual vehicle geographic location data. In block 730 the system determines a vehicle exposure profile for the at least one individual vehicle, the vehicle exposure profile including proximity of the individual vehicle geographic location data to the severe weather geographic boundary data. In block 740 the system the system receives an insurance claim profile including at least one insurance claim. In block 760 the system determines an insurance exposure profile for the at least one individual vehicle using the vehicle exposure profile, the insurance exposure profile including the severe weather profile, the automotive sensor profile, and the insurance claim profile. In block 770 the system determines the validity of the at least one insurance claim using the insurance exposure profile.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A computer-readable medium storing instructions, the instructions comprising:
   one or more instructions which, when executed by a processor, cause the processor to:
      receive a weather profile including:
         weather duration data,
         weather geographic boundary data,
            the weather geographic boundary data indicating a weather geographic boundary, and
         weather type data;
      receive an automotive sensor profile for at least one individual vehicle,
         the automotive sensor profile including individual vehicle geographic location data indicating a geographic location of the at least one individual vehicle;
      compute, based on the weather profile and the automotive sensor profile, a vehicle exposure profile for the at least one individual vehicle,
         the vehicle exposure profile indicating that the geographic location of the at least one individual vehicle is within the weather geographic boundary;
      remotely activate, based on the vehicle exposure profile indicating that the geographic location of the at least one individual vehicle is within the weather geographic boundary, at least one automotive sensor of the at least one individual vehicle;
      receive automotive sensor data from the at least one automotive sensor after remotely activating the at least one automotive sensor;
      compute, based on the automotive sensor profile, the automotive sensor data, and the weather profile, a risk exposure profile for the at least one individual vehicle;
      store the risk exposure profile;
      receive a claim profile including information associated with at least one claim,
         the claim profile being added to the risk exposure profile, and
         the at least one claim being filed in connection with the at least one individual vehicle; and
      determine a validity of the at least one claim based on the risk exposure profile.

2. The computer-readable medium of claim 1, where the instructions further include:
   one or more instructions to transmit a message to an individual associated with the at least one individual vehicle based on the vehicle exposure profile indicating that the geographic location of the at least one individual vehicle is within the weather geographic boundary.

3. The computer-readable medium of claim 1, where the instructions further include:
   one or more instructions to assign a risk avoidance profile when the automotive sensor profile indicates the at least one individual vehicle is operating within the weather geographic boundary in a manner that reduces exposure to a risk associated with a weather type indicated by the weather type data.

4. The computer-readable medium according to claim 3, where the instructions further include:
   one or more instructions to implement a premium discount to the at least one individual vehicle assigned the risk avoidance profile.

5. The computer-readable medium of claim 1, where the automotive sensor data includes at least one of:
   anti-lock brake data,
   vehicle motion data,
   vehicle speed data,
   vehicle telemetry data,
   airbag activation data,
   vibration sensor data,
   external temperature data,
   road condition data, or
   audio sensor data.

6. A method, comprising:
   receiving, by a device, a weather profile including:
      weather duration data,
      weather geographic boundary data,
         the weather geographic boundary data indicating a weather geographic boundary, and
      weather type data;
   receiving, by the device, an automotive sensor profile for at least one individual vehicle,
      the automotive sensor profile including individual vehicle geographic location data indicating a geographic location of the at least one individual vehicle;

computing, by the device and based on the weather profile and the automotive sensor profile, a vehicle exposure profile for the at least one individual vehicle,
   the vehicle exposure profile indicating that the geographic location of the at least one individual vehicle is within the weather geographic boundary;
remotely activating, by the device and based on the vehicle exposure profile indicating that the geographic location of the at least one individual vehicle is within the weather geographic boundary, at least one automotive sensor of the at least one individual vehicle;
receiving, by the device, automotive sensor data from the at least one automotive sensor after remotely activating the at least one automotive sensor;
computing, by the device and based on the automotive sensor profile, the automotive sensor data, and the weather profile, a risk exposure profile for the at least one individual vehicle;
storing, by the device, the risk exposure profile;
receiving, by the device, a claim profile including information associated with at least one claim,
   the claim profile being added to the risk exposure profile, and
   the at least one claim being filed in connection with the at least one individual vehicle; and
determining, by the device, a validity of the at least one claim based on the risk exposure profile.

7. The method of claim 6, where the automotive sensor data includes at least one of:
   anti-lock brake data,
   vehicle motion data,
   vehicle speed data,
   vehicle telemetry data,
   airbag activation data,
   vibration sensor data,
   external temperature data,
   road condition data, or
   audio sensor data.

8. The method of claim 6, further comprising:
   transmitting a message to an individual associated with the at least one individual vehicle based on the vehicle exposure profile indicating that the geographic location of the at least one individual vehicle is within the weather geographic boundary.

9. The method of claim 6, further comprising:
   assigning a risk avoidance profile when the automotive sensor profile indicates the at least one individual vehicle is operating within the weather geographic boundary in a manner that reduces exposure to a risk associated with a weather type indicated by the weather type data.

10. The method of claim 9, further comprising:
    implementing a premium discount to the at least one individual vehicle assigned the risk avoidance profile.

11. A device, comprising:
    a memory to store instructions; and
    a processor to execute the instructions to:
       receive a weather profile including:
          weather duration data,
          weather geographic boundary data,
             the weather geographic boundary data indicating a weather geographic boundary, and
          weather type data;
       receive an automotive sensor profile for at least one individual vehicle,
          the automotive sensor profile including individual vehicle geographic location data indicating a geographic location of the at least one individual vehicle;
       compute, based on the weather profile and the automotive sensor profile, a vehicle exposure profile for the at least one individual vehicle,
          the vehicle exposure profile indicating that the geographic location of the at least one individual vehicle is within the weather geographic boundary;
       remotely activate, based on the vehicle exposure profile indicating that the geographic location of the at least one individual vehicle is within the weather geographic boundary, at least one automotive sensor of the at least one individual vehicle;
       receive automotive sensor data from the at least one automotive sensor after remotely activating the at least one automotive sensor;
       compute, based on the automotive sensor profile, the automotive sensor data, and the weather profile, a risk exposure profile for the at least one individual vehicle;
       store the risk exposure profile;
       receive a claim profile including information associated with at least one claim,
          the claim profile being added to the risk exposure profile, and
          the at least one claim being filed in connection with the at least one individual vehicle; and
       determine a validity of the at least one claim based on the risk exposure profile.

12. The device of claim 11, where the automotive sensor data includes at least one of:
    anti-lock brake data,
    vehicle motion data,
    vehicle speed data,
    vehicle telemetry data,
    airbag activation data,
    vibration sensor data,
    external temperature data,
    road condition data, or
    audio sensor data.

13. The device of claim 11, where the processor is further to:
    assign a risk avoidance profile when the automotive sensor profile indicates the at least one individual vehicle is operating within the weather geographic boundary in a manner that reduces exposure to a risk associated with a weather type indicated by the weather type data.

14. The device of claim 13, where the processor is further to:
    implement a premium discount to the at least one individual vehicle assigned the risk avoidance profile.

15. The computer-readable medium of claim 1, where the claim profile includes at least one other claim, and
    where the instructions to determine the validity of the at least one claim include:
       one or more instructions to determine the validity of the at least one claim based on the at least one other claim.

16. The computer-readable medium of claim 1, where the automotive sensor profile includes audio sensor data and vibration sensor data.

17. The method of claim 6, where the claim profile includes at least one other claim, and where determining the validity of the at least one claim includes:
　determining the validity of the at least one claim based on the at least one other claim.

18. The method of claim 6, where the automotive sensor profile includes audio sensor data and vibration sensor data.

19. The device of claim 11, where the claim profile includes at least one other claim, and
　where the processor, when determining the validity of the at least one claim, is to:
　　determine the validity of the at least one claim based on the at least one other claim.

20. The device of claim 11, where the automotive sensor profile includes audio sensor data and vibration sensor data.

\* \* \* \* \*